United States Patent [19]
Pfeiffer et al.

[11] Patent Number: 5,601,311
[45] Date of Patent: Feb. 11, 1997

[54] SEAT BELT WEB GUIDE

[75] Inventors: Robert C. Pfeiffer, Loudon, Tenn.; Philip H. Goniea, Romulus; Stephan F. Vetter, St. Clair, both of Mich.

[73] Assignee: AlliedSignal Inc., Morristown, N.J.

[21] Appl. No.: 416,020

[22] Filed: Apr. 3, 1995

Related U.S. Application Data

[63] Continuation of Ser. No. 198,162, Feb. 17, 1994, abandoned.
[51] Int. Cl.⁶ .................................................. B60R 22/00
[52] U.S. Cl. ........................ 280/801.1; 280/808; 297/482
[58] Field of Search ............................. 280/801.1, 801.2, 280/808; 297/468, 473, 482, 483; 24/176, 198

[56] References Cited

U.S. PATENT DOCUMENTS

| | | | |
|---|---|---|---|
| 4,389,059 | 6/1983 | Stephenson | 280/808 |
| 4,549,269 | 11/1985 | Pilarski | 280/808 |
| 4,642,853 | 2/1987 | Plesmarski et al. | 280/808 X |
| 4,861,070 | 8/1989 | Boag | 280/808 |
| 4,955,639 | 9/1990 | Yamamoto | 280/808 |
| 5,096,224 | 3/1992 | Murakami | 280/801.1 |
| 5,207,452 | 5/1993 | Collins | 280/801 |
| 5,303,953 | 4/1994 | Kamiyani et al. | 280/808 X |

*Primary Examiner*—Margaret A. Focarino
*Assistant Examiner*—Christopher Ellis
*Attorney, Agent, or Firm*—Markell Seitzman

[57] ABSTRACT

A web guide (20) having a load absorbing core (30), a hinge and an integral cover (170). The core is covered by a synthetic resin that also forms the integral cover and hinge. The cover is locked into place by tabs integrally formed by the coating material.

15 Claims, 2 Drawing Sheets

SEAT BELT WEB GUIDE

This application is a continuation of prior complete application Ser. No. 08/198,162, filed on Feb. 17, 1994, now abandoned.

BACKGROUND AND SUMMARY OF INVENTION

The present invention generally relates to a web guide for a seat belt.

Web guides, or D-rings as they are also called, are primarily utilized to support the shoulder belt portion of a safety belt relative to an occupant's shoulder.

It is the object of the present invention to provide an improved web guide or D-ring. It is another object to provide a web guide having a cover integrally joined to a load absorbing core by a hinge. While some prior web guides may have occasionally included a cover, such as illustrated in U.S. Pat. No. 5,207,452, there are no one-piece web guides that include integral covers and a load absorbing core as provided for in the present invention. Further, an inspection of the prior art, including currently manufactured web guides, show that the material used to coat the core is only black, which has a marked, negative effect on customer or driver satisfaction because it is different than the color of the other interior trim parts of the passenger compartment. In the present invention, a synthetic ionomer resin covers the load absorbing core and forms the integral hinge and cover. This type of resin is structurally sound, and has a low coefficient of friction and can be made in colors so that the entire web guide (core, hinge and cover) can match the color of the interior trim parts of the passenger compartment or even the color of the seat belt webbing.

Accordingly the invention comprises: a web guide for supporting a portion of a safety belt webbing comprising: a load absorbing core including a first part having a central opening via which the web guide is mounted relative to a vehicle mounting surface; and a second part having a first oval opening. A thin layer of coating material is applied to the first part and also narrows the central opening forming a bushing thereabout. A thicker layer of material covers most of the second part of the core and provides an integral support surface upon which the safety belt webbing can easily slide. The thicker layer of coating material includes a transition surface having a step recessed below a front surface of the thicker layer. A hinge, formed of the coating material, integrally extends from the coating material that covers the first part. A cover, also formed of the coating material, integrally extends from the hinge and includes a front surface having a top part joined to the hinge, side parts and a bottom part. The bottom part of the cover being shaped such that when the cover is rotated about the hinge to its closed position, the bottom part of the cover engages the step on the transition surface. When the cover is closed it is generally coplanar with the front surface of the thick layer. The cover further includes a latch that engages a latch boss on the core to keep the cover closed.

Many other objects and purposes of the invention will be clear from the following detailed description of the drawings.

DETAILED DESCRIPTION OF THE DRAWING

Figure 3:
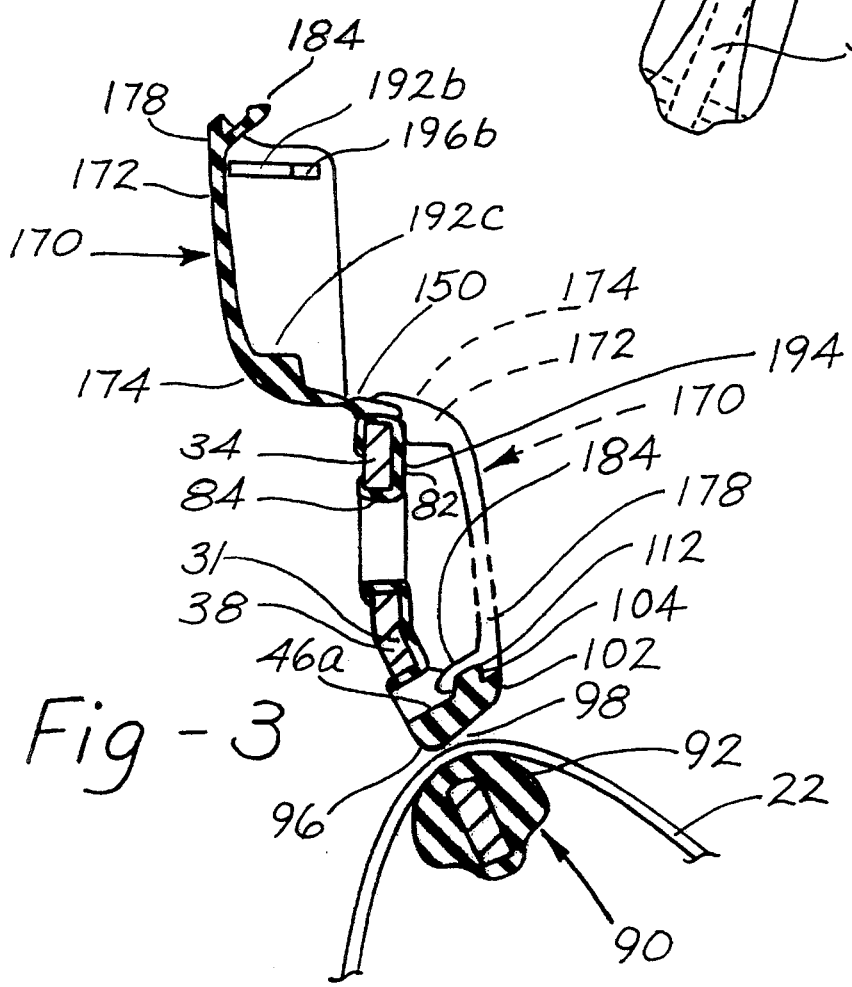
FIG. 3 shows a cross sectional view taken generally along section 3—3 of FIG. 1.

With reference to the FIGURES there is shown a web guide 20 for supporting a portion of safety belt webbing 22 (shown in FIG. 3). The web guide is adapted to be mounted relative to a vehicle mounting surface, such as the B-pillar or alternatively a structural support member within an automotive seat. The web guide 20 includes a metal load absorbing plate or core 30 that is bent slightly about a bend line 31. The core 30 is generally triangular in shape with truncated, curved corners. The load absorbing core 30 includes an upper first part 34 having a central opening 36 and a lower second part 38 which extends from and is positioned below the first part and below the bend line 31. The second part includes an oval opening 35 bounded by a top 40, sides 40a,b and a bottom 44. The top 40 also includes a notch 37 which forms a widened center part of the opening 35. The second part of the core further includes two locating apertures 46a and 46b within a central portion 50 of the top 40. These locating apertures are used to spatially lift the core 30 relative to inside walls of a mold so that a coating material 80 can flow about the core as the material 80 is molded thereabout. The coating material 80, such as an ionomer plastic resin or other lubricous polymeric material, which displays a high degree of lubricity, is molded about the core 30. One such preferred material is DuPonts' Bexloy W. A relatively thin layer 82 of this covering material 80 covers the front and sides of the first part 34 of the core. The thin layer 82 also covers the central portion 50 of the top of the second part of the core 30, including the top and sides of the notch 37. As can be seen from FIG. 1, the metal surface about the locating apertures 46a and 46b remains exposed for shouldering standoff pins in the mold. The thin layer 82 also extends along the edge of the rear surface of the first part to lock the thin layer 80 in place on the core 30. The thin layer 82 of coating material 80 reduces the diameter of the central opening 36 forming a narrowed opening 36'. The coating material 80 or 82 inside the narrowed central opening 36' forms an integral bushing 84 through which a mounting fastener 86 is inserted. As can be appreciated the web guide is rotatable about the axis of fastener 86.

A thicker layer 90 of the coating material 80 covers the ends 52a and 52b of the top 40 of the second part 36 outboard of the locating apertures 46a and 46b. The sides 42a,b and bottom 44 are also covered by this increased thickness layer 90. As can be seen, this layer 90 of coating material is also formed into a bridge 94 which extends generally across the top of the oval opening 35 in the core 30. The bridge 94 in concert with the coating material 82 covering the notch 37 reduces the size of the notch 37 forming a generally rectangular opening 95. The bridge 94 includes a boss 96 which extends from a lower surface. As mentioned the thick layer of coating material 92 also covers the bottom of the second part 34 of the core 30 and provides an integral support surface 92 upon which the safety belt 22 can easily slide. As can be seen from the cross-sectional view FIG. 3, this thick layer 90, proximate the location of contact with the safety belt webbing 22, is generally circular in cross-section and has a radius of approximately ten millimeters. The boss 96 as well as the material covering the bottom of the second part of the core reduces the size of the opening 35 to a spacing or slit 98 slightly more that the thickness of the webbing 22 to prevent the webbing 22 from twisting.

Figure 1:
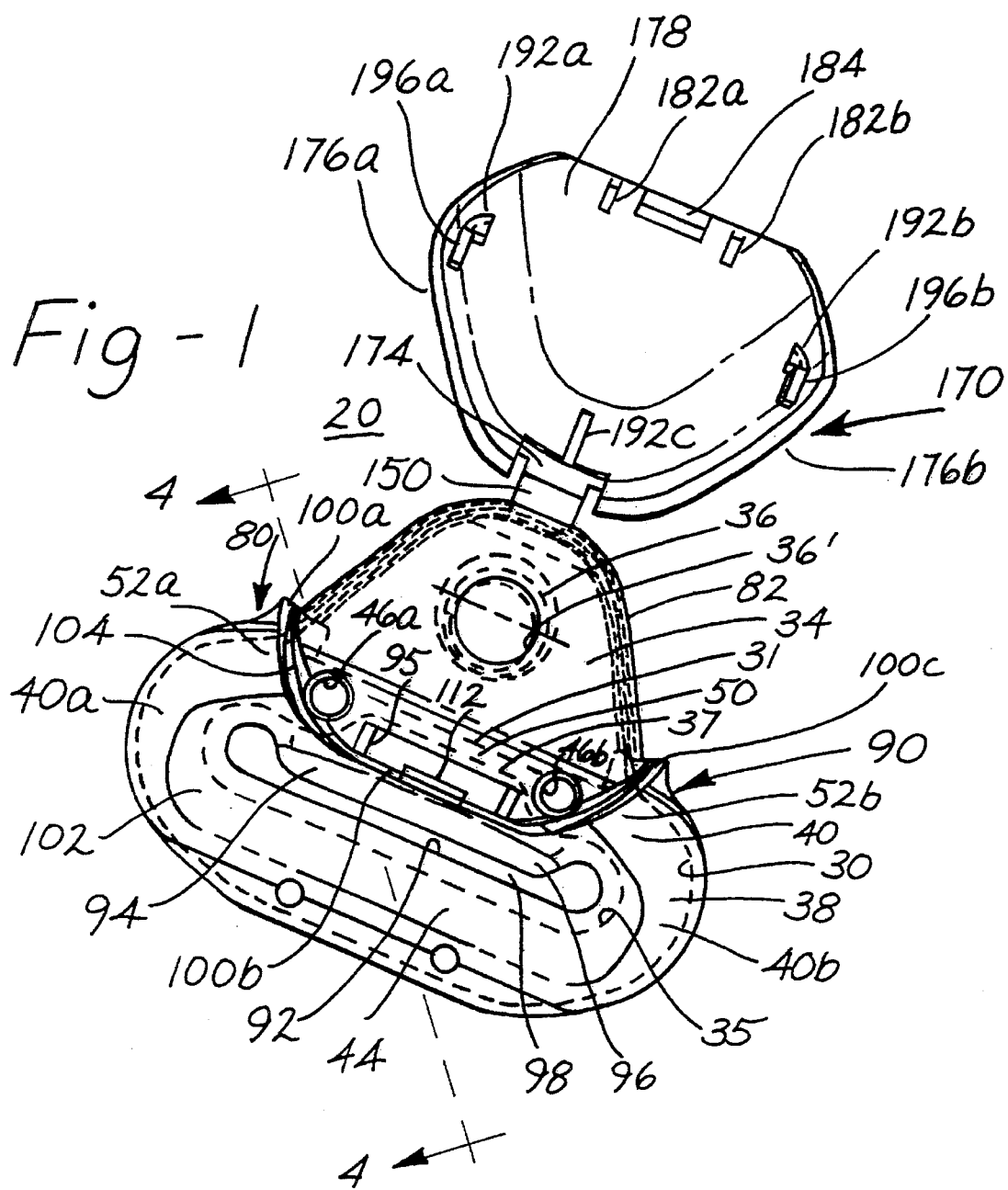
FIG. 1 shows a plan view of a web guide.
Figure 4:
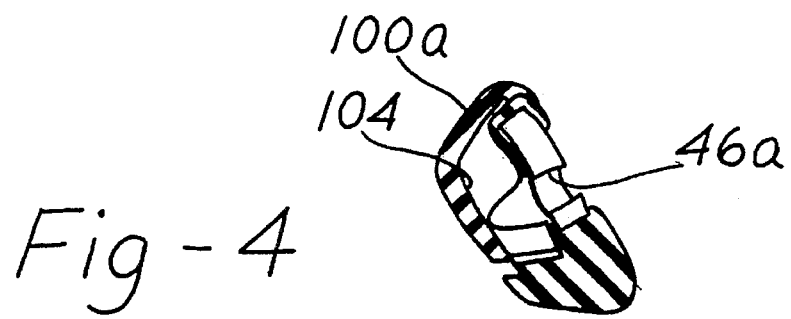
FIG. 4 shows partial cross sectional view of a portion of the web guide.

As can be seen from FIGS. 1 and 3, the thick layer 90, which covers the ends of 52a and 52b of the central portion and forms the bridge 94 includes an inwardly extending transition surface having sections 100a, 100b and 100c. Each section of the transition surface includes a stepped or shoulder portion 104 recessed below the front surface 102 of the thick layer 90 of covering material. The central portion 110b, at its step includes a narrow extending portion of coating material forming a latch boss 112 which engages a latch formed on a cover.

Figure 2:
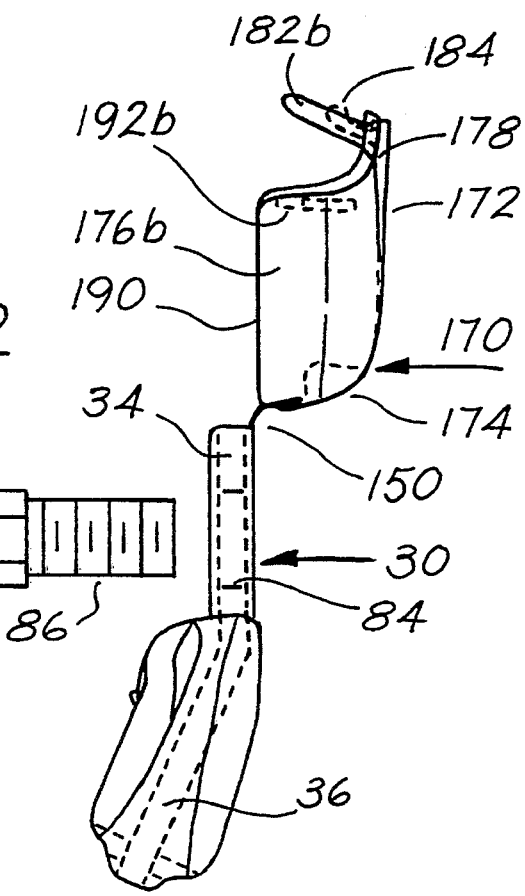
FIG. 2 shows a side view of the web guide.

Extending upwardly from the coating about the first part 34 of the core 30, formed by a thin section of the resin coating material 80, is an integral hinge 150. Extending from the hinge 150 is an integrally molded cover 170. The cover 170 is shown in an opened configuration in FIGS. 1 and 2. The phantom lines in FIG. 3 show the cover closed and latched in place. The cover 170 includes a front surface 172 and two angled sides 176s and 176b. The sides meet at a top part 174 (referenced to its position when the cover is closed) generally at the hinge 150. The front surface 172 is sculptured so as to make a smooth transition into the sides and top part. A bottom part 178 (referenced to its position when the cover is closed) of the cover 170 is shaped such that when the cover 170 is rotated about the hinge 150 toward the covered load absorbing core 30, the bottom part 178 engages the step 104 on each transition surface 100a,b and c. In addition, the front surface 172 of the cover 170, when in this rotated, closed configuration, is generally coplanar of the first surface 102 of the thick layer 90 of the covering material.

The cover 170 further includes two locating tabs 182a and 182b extending from the inside of the front surface. Also extending down from the inside of the front surface 172 of the cover is a stepped, cover latch 184 which lockingly engages the latch boss 112 on the bridge 94. When the cover 170 is rotated, the locating tabs slidingly engage the sides of the rectangular opening 95 providing lateral stability for the cover, that is, with the cover latched in place and with the locating tabs against the sides of the rectangular opening 95 the cover 170 is inhibited from being moved to the left or to the right. The cover also includes three perpendicularly extending ribs 192a, 192b and 192c which extend outwardly generally from the inside of the transition surface between the front surface and the sides. These ribs 192 engage the coating material on the front surface 194 of the first part of the core 30 and with the cover 170 latched in place, position the front surface 172 at a determinable distance from the core 30 so that the front surface 172 is generally in line with the top surface 102 of the thick layer of covering material 92.

FIGS. 1 and 3 also show two other tabs 196a and 196b which extend from ribs 192a, and b generally downwardly on the inside surface of each side 176a,b. These tabs 196 are designed to engage the sides of the coated first part of the core 30, and provide additional lateral stability of the cover 170.

Many changes and modifications in the above described embodiment of the invention can, of course, be carried out without departing from the scope thereof. Accordingly, that scope is intended to be limited only by the scope of the appended claims.

We claim:

1. A seat belt web guide comprising:

a load absorbing core including a first part having a first opening and a second part having a second opening, a coating material for coating the core and said first and second openings, said coating material including:

a first portion whereby a low friction surface is provided upon which a safety belt may slide, said first portion being integrally formed about the second opening, a second portion forming an integral hinge connected to the part of said coating material which coats said core, said second portion further forming a fastener cover extending from said hinge.

2. The web guide as defined in claim 1 wherein a portion of the coating material is formed as a locating hole or cavity and wherein the cover includes a least one locating tab, received in the locating hole or cavity when the cover is closed to inhibit the cover from moving laterally about the hinge.

3. The web guide as defined in claim 2 wherein the cover includes two locating tabs.

4. The web guide as defined in claim 1 wherein the cover includes a latch and wherein a portion of the coating material is formed into a latch boss engagable with the latch to hold the cover in place upon the coated core.

5. The web guide as defined in claim 1 wherein the cover includes a plurality of ribs which engage the coating material on the core to space a front surface of the cover at a determinable distance from the core coating material.

6. The web guide as defined in claim 5 wherein certain one of the ribs include a leg engagable with the coating material on sides of the core to inhibit the cover, after it is closed from moving laterally.

7. A web guide (20) for supporting a portion of safety belt webbing (22), the web guide adapted to be mounted relative to a mounting surface, comprising:

a load absorbing core (30) including a first part (34) having a central opening (36); and a second part (38), below the first part (34) having a top (40), sides (40a,b) and a bottom (44), the second part including a first opening (39) remote from the central opening (36);

a covering material (80) molded about the core (30) including first means for covering portions of the first and second parts of the core and second means for forming a web receiving opening (98) in the first opening (35) and third means for forming, about the second part of the core (30), a webbing supporting surface, and fourth means for forming a hinge (150) and cover (170) extending from the hinge (150) wherein the first, second, third and fourth means are of integral construction.

8. The web guide as defined in claim 7 wherein the coating material includes means for forming a first latch part (112) and wherein the cover includes latch means (184) for engaging the first latch part to latch the cover in place on the covering material.

9. A web guide (20) for supporting a portion of safety belt webbing (22), the web guide adapted to be mounted relative to a mounting surface, comprising:

a load absorbing core (30) including a first part (34) having a central opening (36); and a second part (38), below the first part (34) having a top (40), sides (40a,b) and a bottom (44), the second part including a first opening (39) remote from the central opening (36);

covering material (80) molded about the core (30) including means for covering portions of the first and second (98) in the first opening (35) and means for forming, about the second part of the core (30), a webbing supporting surface, and means for forming an integral hinge (150) and integral cover (170) extending from the hinge (150), wherein the first part of the core (30) includes a notched portion (37) above and forming part of the first opening (35), and wherein a thin layer of material covers a top and sides of the notched portion (37), and wherein the cover (170) includes locating tabs (182) engagable with the sides of the covered notched portion to inhibit the cover (170) from moving side to side.

10. The device as defined in claim 9 wherein the cover (170) includes ribs (192) engagable with the thin layer on the core to space the front surface of the cover at a determinable spacing from the first part of the core.

11. The device as defined in claim 10 wherein certain ones of the ribs include a leg (196) engagable with sides of the first part when the cover is closed to inhibit the cover from being moved side to side.

12. A web guide (20) for supporting a portion of safety belt webbing (22), the web guide adapted to be mounted relative to a mounting surface comprising:

a load absorbing core (30) including a first part (34) having a central opening (36); and a second part (38), below the first part (34) having a top (40), sides (40a,b) and a bottom (44), the second part including a first opening (35) remote from the central opening (36);

a covering material (80) molded about the core (30) wherein a relatively thin layer of the covering material covers the first part (34) and a central portion (50) of the top (40) of the second part, the thin layer (82) reducing the diameter of the central opening (36), and provides an integral bushing (84) about the central opening (36) for receipt of a mounting fastener, and a thick layer (90) of the covering material (80) covers ends (52a,b) of the central portion of the top of the second part and forms a bridge (94) across a top portion of the first opening (35), the bridge (94) supporting an internal latch boss (112), the thick layer also enveloping the sides (42a,b) and bottom (44) of the second part of the core (30) reducing the size of the first opening forming a webbing receiving opening or slit (98) and providing an integral support surface (92) upon which the safety belt webbing (22) can slide;

the thick layer (90) near each of the ends (52a,b) and across the bridge (94) including transition surfaces (100a,b,c), each transition surface (100a,b) includes a step or shoulder (104) recessed below a first or front surface (102) of the thick layer (90);

a hinge (150), integrally formed of the covering material, extends from the covering material (80) about the first part (34);

a cover (170), integrally formed of the covering material, extends outward from the hinge and includes a front surface (172) having a top part (174) joined to the hinge, side parts (176a,b) and a bottom part (178);

the bottom part (178) of the cover (170) is shaped such that when the cover (170) is latched in place the bottom part engages the step (104) on each transition surface (100a,b,c) and the front surface (172) of the cover (170) is generally coplanar with the first surface (102) of the thick layer (90); and the cover (170) further includes latch means (84) engagable with the latch boss (112) for latching the cover in place.

13. The device as defined in claim 12 wherein the first part of the core (30) includes a notched portion (37) above and forming part of the first opening (35), and wherein the thin layer of material covers a top and sides of the notched portion (37), and wherein the cover (170) includes locating tabs (182) engagable with the sides of the covered notched portion to inhibit the cover (170) from moving side to side.

14. The device as defined in claim 12 wherein the cover (170) includes ribs (192) engagable with the thin layer on the core to space the front surface of the cover at a determinable spacing from the first part of the core.

15. The device as defined in claim 14 within certain ones of the ribs include a leg (196) engagable with sides of the first part when the cover is closed to inhibit the cover from being moved side to side.

* * * * *